United States Patent
Zabelin

(10) Patent No.: US 9,828,910 B2
(45) Date of Patent: Nov. 28, 2017

(54) INTERNAL COMBUSTION ENGINE EFFICIENCY

(71) Applicant: Pavel Zabelin, New York, NY (US)

(72) Inventor: Pavel Zabelin, New York, NY (US)

( * ) Notice: Subject to any disclaimer, the term of this patent is extended or adjusted under 35 U.S.C. 154(b) by 179 days.

(21) Appl. No.: 14/927,401

(22) Filed: Oct. 29, 2015

(65) Prior Publication Data

US 2017/0122200 A1    May 4, 2017

(51) Int. Cl.
*F02B 77/04* (2006.01)
*F02B 47/00* (2006.01)
*F02M 27/04* (2006.01)

(52) U.S. Cl.
CPC .............. *F02B 77/04* (2013.01); *F02B 47/00* (2013.01); *F02M 27/04* (2013.01)

(58) Field of Classification Search
CPC .... F02B 77/04; F02B 2077/045; F02B 47/00; F02M 27/04; F02M 25/00; F02M 27/00
See application file for complete search history.

(56) References Cited

U.S. PATENT DOCUMENTS

| | | | | |
|---|---|---|---|---|
| 8,720,419 B2* | 5/2014 | Zabelin | ................... | F02B 47/00 123/539 |
| 8,776,765 B2* | 7/2014 | Zabelin | ................... | F02B 47/00 123/539 |
| 9,062,600 B2* | 6/2015 | Zabelin | ................... | F02B 47/00 |
| 2015/0377121 A1* | 12/2015 | Zabelin | ................... | F02B 47/00 123/539 |

* cited by examiner

*Primary Examiner* — Jacob Amick

(57) ABSTRACT

The method disclosed increases the energy conversion efficiency of a spark ignition internal combustion engine by substantial reduction of friction between the cylinder walls and associated piston rings. The result is achieved by eliminating the unwanted carbonaceous deposits on cylinder walls and associated piston rings by vapor nitric acid (HNO3). Nitric acid is produced through chemical reaction between oxygen (O2) and water vapor (H2O) in air and nitric dioxide (NO2), generated inside combustion chambers during intake and compression strokes by electric discharge on spark plugs. Specially designed or modified ignition system is used as a source of high-voltage for feeding the discharge.

1 Claim, No Drawings

INTERNAL COMBUSTION ENGINE EFFICIENCY

BACKGROUND OF THE INVENTION

U.S. Pat. Nos. 8,720,419; 8,776,765; 9,062,600, the disclosure of each of which is incorporated herein by reference, disclose and claim the method for increasing the energy conversion efficiency of internal combustion engines (ICE) by reducing friction between cylinder walls and associated piston rings, thereby reducing fuel consumption, extending operating life of the piston rings and cylinder walls, and reducing greenhouse emission.

The method of the aforementioned patents is to generate nitrogen dioxide (NO2) by electric discharge in air intake path of an engine by means of high-voltage generator (HV generator), where NO2 reacts with the water vapors (H2O) and oxygen (O2) to provide vapors of HNO3 (nitric acid), that dissolve carbonaceous deposits on the cylinder walls and on associated piston rings during intake and compression strokes, thereby reducing friction.

The major purpose of this invention is to improve the principal method for spark ignition ICEs only by eliminating the necessity to use a separate discharge electrodes and HV generator, and thereby simplify the embodiments of the principal method and reduce the cost of its utilization.

DESCRIPTION

The principal invention discloses and claims that nitrogen dioxide is generated specifically in an air intake path of an engine. All embodiments of the principal patents incorporate the use of HV generator and discharge electrodes for creating high-voltage discharge in the air intake path.

The advantage of the method of the principal invention is that it can be utilized on vehicles in use by easily retrofitting the HV generator and discharge electrodes into existing vehicles without making changes to ICE. HV generator and discharge electrodes can also be installed into the air intake path of new vehicles during production cycle.

The improvement of the principal method, which is limited to spark ignition engines, is that instead of generating nitrogen dioxide in engine's air intake path, it is being generated inside the engine's combustion chambers during intake and compression strokes by using engine's spark plugs as discharge electrodes and engine's ignition system as the source of high-voltage.

The improvement of the principal method implies that ICE's ignition system is designed or modified in such a way that it becomes capable of supplying one or more high-voltage impulses to the spark plugs during intake and compression strokes to generate NO2. These high-voltage impulse(s) for generating NO2 are further referred to as supplementary impulse(s) in order to distinguish them from ignition impulses traditionally used for igniting air/fuel mixture. The improvement also implies that the amplitude of the supplementary impulse(s) is low enough so that not to ignite the air/fuel mixture. This provision is not the case for Direct Fuel Injection ICEs, where fuel is injected right before the spark plugs fire.

The improvement thereof can be implemented by different embodiments. The least modification is needed for ICEs using Distributorless Ignition System, i.e. those having a separate coil for each cylinder (or couple of cylinders) on engines with Direct Fuel Injection, because in these systems coils and secondary (output) circuit of Ignition Module are powerful enough to generate supplementary impulse(s) and, accordingly, in many cases only primary circuit (controller) of Ignition Module, i.e. the part which governs the timing of the sparks, needs to be modified.

In case the Distributorless Ignition System is paired with injection ICE, and amplitude of supplementary impulse(s) is lower than that of the ignition impulses, the modification of the primary circuit of Ignition Module is likely to be more substantial.

In case of mass scale production the modification of the primary circuit of the Ignition Module will cost automakers close to nothing, which means that the improvement makes the principal method not only simpler, but also cheaper to implement.

What is claimed is:

1. A method of increasing efficiency of a spark ignition internal combustion engine by reducing friction between cylinder walls and associated piston rings, the method comprising: generating nitrogen dioxide (NO2) by high-voltage electric discharge, whereby the chemical reaction between NO2, oxygen of air, water vapor in air provides reactant HNO3, which chemically dissolves the carbonaceous deposits that substantially contribute to the friction between the cylinder walls and associated piston ring,
   wherein the nitrogen dioxide in the said method is generated inside combustion chambers of the engine during intake and/or compression strokes by a supplementary electric discharge(s) of spark plugs,
   wherein the high-voltage for said supplementary electric discharge(s) is coming from a specially designed or modified ignition system, capable of generating said supplementary electric discharge (s); and the amplitude of the high-voltage for said supplementary electric discharge(s) is low enough to not ignite the air/fuel mixture in said chambers during the intake and compression strokes.

* * * * *